April 20, 1943.  S. GINKA  2,317,049
CHRISTMAS TREE STAND
Filed Sept. 21, 1942
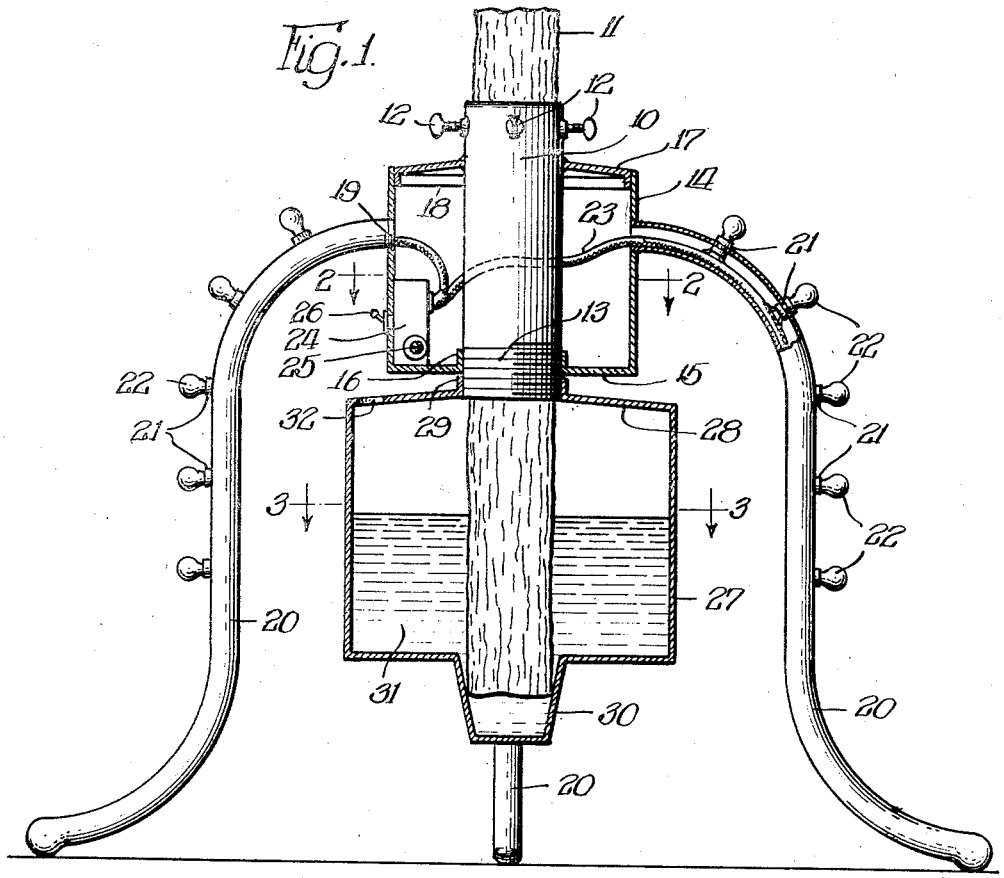
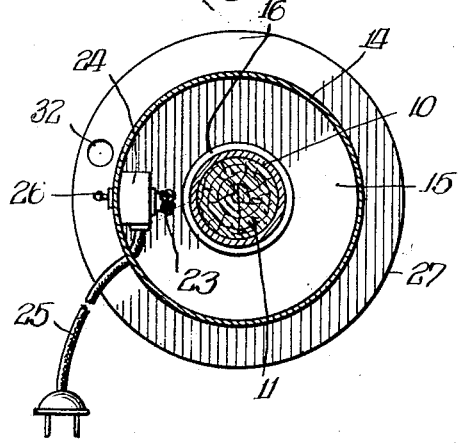
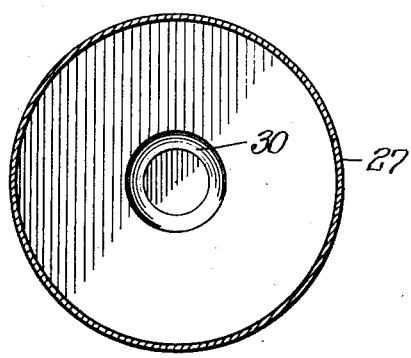
INVENTOR.
Stephen Ginka,
BY
B. Pelechowicz
Atty.

Patented Apr. 20, 1943

2,317,049

UNITED STATES PATENT OFFICE 2,317,049

CHRISTMAS TREE STAND

Stephen Ginka, Chicago, Ill.

Application September 21, 1942, Serial No. 459,157

3 Claims. (Cl. 248—44)

The present invention relates to Christmas tree stands and has for its main object the provision of a Christmas tree stand which may provide a vertical and lateral support for the tree.

A still further object of the present invention is the provision of a Christmas tree holder which would include a receptacle adapted to receive an amount of water for the purpose of irrigating the tree.

A still further object of the present invention is the provision of a Christmas tree stand of the character indicated, and which may include a sleeve for laterally supporting the tree and water receivable receptacle disengageably carried by said sleeve, and in which said receptacle the lower end of the tree may be positioned for a vertical as well as lateral support.

A still further object of the present invention is to generally improve a Christmas tree stand.

With the above general objects in view and others that will appear as the invention is better understood, the same consists in the novel construction, combination and arrangement of parts hereinafter more fully described, illustrated in the accompanying drawing and pointed out in the appended claims.

In the drawing forming a part of this application, and in which like designating characters refer to corresponding parts throughout the several views:

Fig. 1 is a vertical transverse view, partially in elevation, illustrating a Christmas tree stand;

Fig. 2 is a horizontal cross-sectional view on line 2—2 of Fig. 1; and

Fig. 3 is a horizontal cross-sectional view on line 3—3 of Fig. 1.

Referring in detail to the present drawing there is shown therein sleeve 10 through which the lower end of Christmas tree 11 is insertable and in which a trunk of the tree is laterally supported. Thumb screws 12 at the upper end of said sleeve 10 provide means for adjusting vertical alignment of the tree and for providing rigid contact between sleeve 10 and trunk of the tree at that point. The lower end of said sleeve 10 is externally threaded as at 13.

The invention further includes a cylindrical casing 14 having an integrally formed bottom wall 15. Said bottom wall 15 is provided with a central opening defined by an annular, upwardly projecting flange 16 which is internally threaded to engage threads 13 of sleeve 10. By virtue of this arrangement casing 14 remains in a rigid position with respect to sleeve 10, but is susceptible for vertical adjustment with respect thereto.

The invention further includes closure 17 which is integrally formed with said sleeve 10, and is downwardly tapering, and is provided with a downwardly depending flange 18 which normally enters the upper open end of casing 14. When in an operative position, said closure 17 maintains said casing 14 in a properly spaced relation with respect to sleeve 10.

Affixed by means of threaded engagement as at 19, and adjacent the upper end of casing 14, and by their upper ends, is a plurality of supporting tubular legs 20. Said legs are provided along the outermost peripheral line with a plurality of sockets 21 receiving a plurality of electric bulbs 22. The sockets are connected with wires 23 leading into a switch box 24, in which they connect with current-supplying wires 25, the latter passing through a suitable opening made in said casing 14, as is seen in Fig. 2. Switch 26, positioned externally of casing 14 provides means for completing the electric circuit for lighting electric bulbs 22.

The invention further includes receptacle 27, including an upper wall 28 provided with a central opening lined up upwardly extending and inwardly threaded flange 29 for engaging threaded end of sleeve 10. Rigidly formed with the bottom wall of receptacle 27, downwardly depending therefrom, and in alignment with opening in wall 28 is a downwardly tapered socket 30, which is adapted to receive the lowermost termination of Christmas tree 11. It is observed that the downwardly constricted lateral wall of said socket 30, provides a firm seat for trees of various widths and affords lateral as well as vertical support for the lowermost end of the tree. Said receptacle 27 is adapted to receive amount of water 31, supplied thereinto through opening 32, made in wall 28.

While there is described herein a preferred embodiment of the present invention, it is nevertheless to be understood that minor changes may be made therein without departing from the spirit and scope of the invention as claimed.

What I claim as new is:

1. A tree stand comprising a sleeve, a casing upon said sleeve in a rigid vertically adjustable relation therewith, a plurality of legs in rigid engagement with said casing, and a receptacle carried by the lower end of said sleeve, a tree being adapted to extend through said sleeve into said receptacle for being vertically supported thereby.

2. A tree stand comprising a sleeve, a casing upon said sleeve in a rigid vertically adjustable relation therewith, a plurality of legs in rigid engagement with said casing, and a receptacle carried by the lower end of said sleeve, a tree being adapted to extend through said sleeve into said receptacle for being vertically supported thereby, the lower end of said receptacle being above the lowermost terminations of said legs.

3. A tree stand comprising a sleeve, a casing in a concentric relation with said sleeve, the lower end of said sleeve being externally threaded, the bottom wall of said casing being provided with a central opening, an internally threaded flange rigidly formed with said bottom wall at the marginal edge of said opening for engaging said sleeve for vertical relative adjustment of said casing with respect to said sleeve, an outwardly flaring annular plate integrally formed with said sleeve and adjacent the upper end thereof, said plate entering the upper open end of said casing for forming a closure therefor, a receptacle, the upper wall of said receptacle being provided with a central opening, an internally threaded flange formed with said upper wall of said receptacle and along the marginal edge of said opening for engaging the lowermost portion of said sleeve, a downwardly tapering socket integrally formed with the bottom wall of said receptacle, said sleeve being in a vertical alignment with said socket for receiving therewithin the lower end of a tree and for affording thereto lateral and vertical support, said receptacle and said socket being adapted to receive an amount of water for irrigating the tree, and a plurality of legs in engagement with said casing, said legs being adapted to maintain said receptacle in an elevated position.

STEPHEN GINKA.